United States Patent Office

3,503,905
Patented Mar. 31, 1970

3,503,905
MOLDING COMPOSITIONS FOR THE PRODUCTION OF FOAM ARTICLES
Ludwig Zuern, Bad Durkheim, Pfalz, Erhard Stahnecker, Ziegelhausen, and Johannes Grohmann and Karl Buchholz, Ludwigshafen (Rhine), Germany, assignors to Badische Anilin- & Soda-Fabrik Aktiengesellschaft, Ludwigshafen (Rhine), Germany
No Drawing. Filed Jan. 5, 1967, Ser. No. 607,393
Claims priority, application Germany, Jan. 15, 1966, B 85,424
Int. Cl. C08f 47/10, 33/08
U.S. Cl. 260—2.5    4 Claims

ABSTRACT OF THE DISCLOSURE

Molding compositions for the production of foam articles consisting essentially of a mixture of a styrene polymer and a brominated polymer of a 1,3-diene.

---

This invention relates to particulate molding materials which contain a styrene polymer, an expanding agent and 0.001 to 0.6% by weight (on the styrene polymer), in homogeneous distribution, of a brominated polymer of a 1,3-diene having a degree of polymerization of at least 2.

According to one method which is very widely used in industry articles of foamed styrene polymers are produced by expanding particulate styrene polymers in molds. In this process the particulate styrene polymers are first heated with steam or a hot gas to a temperature above their softening point so that they expand to form a loose material. This step is known as pre-expansion. The pre-foamed styrene polymers are stored and then expanded in a perforated pressure-resistant mold by means of superheated steam so that they fuse together to form a molding whose dimensions correspond to those of the mold's internal cavity. This step is known as molding. After molding, the article thus obtained is cooled in the mold. Cooling must be continued until the internal sections of the article have cooled to a temperature below the softening point of the styrene polymers. If it is removed from the mold beforehand, deformation may result. Since foam plastics are good insulators, relatively long periods are necessary to cool the moldings. The period after which the article may be removed from the mold without there being any subsequent deformation is usually called the minimum residence time.

It is known that moldings, which can be removed from the mold after comparatively short cooling periods, may be obtained by expanding particulate styrene polymers which contain expanding agent and whose particles are coated with small amounts of an organic compound which dissolves or swells the styrene polymer. A disadvantage of this method, however, is that particles coated with organic compounds cannot be expanded, under comparable conditions, to such a high degree as uncoated particles. Moreover, the expansion of coated particles may result in foam structures having an uneven cell structure. This is particularly disadvantageous in the production of articles which are used for decorative purposes. It has also been found that the coated particles immediately after pre-expansion are particularly sensitive to pressure with the result that they may be easily deformed when conveyed pneumatically.

It is an object of this invention to provide molding compositions which, after having been foamed, can be removed from the molds after relatively short minimum residence time.

It is another object of this invention to provide molding compositions, which after having been foamed, having a very fine-celled structure. Other objects will become apparent from the following more detailed description of this invention.

We have now found that particulate molding compositions for the production of foam articles consisting essentially of a styrene polymer and a blowing agent have particularly advantageous properties when the particles contain 0.001 to 0.6% by weight (on the styrene polymers), in homogeneous distribution, of a brominated polymer of a 1,3-diene having a degree of polymerization of at least 2.

Styrene polymers for the purposes of the invention are polystyrene and styrene copolymers which contain at least 50% by weight of styrene units. Examples of suitable copolymerization components are α-methylstyrene, acrylonitrile, methacrylonitrile, esters of acrylic or methacrylic acid and alcohols having 1 to 8 carbon atoms, esters of fumaric acid and alcohols having 1 to 8 carbon atoms, vinylpyridine, N-vinyl compounds, such as N-vinylcarbazole, butadiene or small amounts, e.g., 0.001 to 1%, preferably 0.01 to 0.1%, by weight of divinylbenzene.

The molding compositions for the production of foam structures may also contain impact-resistant styrene polymers. These include for example mixtures which are obtained by polymerizing styrene, if desired with other monomers, in the presence of finely divided elastomeric polymers. Such polymers may also be prepared by mixing styrene/acrylonitrile copolymers with butadiene polymers or acrylic ester polymers.

The molding materials advantageously contain as foaming agents liquid or gaseous organic compounds which do not dissolve the polymer and whose boiling point is below the polymer's softening point, e.g. aliphatic or cycloaliphatic hydrocarbons, such as propane, butane, pentane, hexane, heptane, cyclohexane, or halohydrocarbons, such as methyl chloride, dichlorodifluoromethane or 1,2,2-trifluoro-1,1,2-trichloroethane. The molding materials may also contain mixtures of foaming agents. It is advantageous to use 3 to 12% by weight, with reference to the styrene polymer, of foaming agent. Furthermore, the compositions may contain additives, such as plasticizers, lubricants, stabilizers, dyes or fillers.

The particulate molding compositions contain 0.001 to 0.6% by weight on the styrene polymers, in homogeneous distribution, of a brominated polymer of a 1,3-diene. Compositions which contain 0.005 to 0.1% by weight of the brominated polymer are preferred. Amounts of less than 0.001% by weight do not bring about the desired processing properties. If the molding materials contain more than 0.6% by weight of the brominated polymer, the processing properties may be adversely affected.

Examples of suitable brominated polymers of 1,3-dienes are the bromination products of butadiene polymers, isoprene polymers or chloroprene polymers; of these the butadiene polymers are preferred. The polymers should have a degree of polymerization of at least 2. In principle polymers having any degree of polymerization above 2 may be used. Usually it is not necessary for the degree of polymerization of the bromination products to be above 2000. Brominated polymers having a degree of polymerization of between 2 and 16 have particularly advantageous properties. The bromination products should advantageously contain 40 to 75% by weight of bromine. Specific examples of especially suitable brominated polymers are 1,2,5,6-tetrabromocyclooctane, 1,2-dibromocyclooctene-(5), 1,2,5,6-9,10-hexabromocyclododecane, brominated 1-vinylcyclohexene or brominated polybutadiene which has a linear structure. For example the bromination products of natural or synthetic rubber are also suitable.

Polymers of butadiene having at least 50% by weight of vinyl groups or 1,2-linkages may for example be prepared by polymerizing butadiene with alkali metals, e.g.

sodium, potassium or lithium, in tetrahydrofuran as the reaction system. Polymers which are obtained in accordance with U.S. patent application No. 582,254, filed Sept. 27, 1966, by Herbert Naarmann, Ernst Guenther Kastning, Herbert Willersinn and Edmund Priebe are particularly suitable. The polymers have a degree of polymerization of between 5 and 200. The process is particularly suitable for manufacturing bromination products of polymers having a degree of polymerization of between 10 and 50.

Bromination is carried out using elementary bromine; the reaction of the polymers with bromine may for example be effected in solution or dispersion. Bromine may for example be also added to the low molecular weight polymers without there being any need for solvents or dispersing agents. It is advantageous to use 0.7 to 1.3 moles of bromine per mole of double bonds. Particularly advantageous results are obtained if bromine is added to polymers which are for example dissolved in n-butanol, carbon disulfide, glacial acetic acid or carbon tetrachloride. Bromination is advantageously carried out in a temperature range between —5° C. and the boiling temperature of the solvent concerned.

The molding materials are in particulate form, e.g., beads, cylindrical granules or lumps such as are obtained by grinding bulk polymers. The particles advantageously have a diameter of 0.1 to 6 mm., preferably from about 0.4 to 3 mm.

The brominated polymers should, if possible, be homogeneously dispersed in the molding materials. This may for example be achieved by polymerizing monomeric styrene, if desired with other monomers, in the presence of an expanding agent and the brominated polymers. It is however also possible to mix the styrene polymer containing expanding agent in the molten state with the brominated polymers. This may for example be carried out in an extruder of conventional design. Care must however be taken to ensure that the compositions are rapidly cooled immediately after they leave the nozzle so that they do not expand before being comminuted. Another very advantageous method of producing the molding compositions according to this invention consists in polymerizing styrene in aqueous suspension and adding the bromine compounds, if desired with the expanding agent, during polymerization at a point when the polymer particles no longer divide ("particle identity point"). For example compositions of polystyrene which contain fairly large amounts of brominated polymer may be advantageously dissolved in monomeric styrene followed by polymerization in the presence of a foaming agent.

The molding materials according to this invention are heated by conventional methods in molds which are not gastight when closed, thus causing the particles to expand and fuse together to form articles whose dimensions correspond to those of the mold's internal cavity. These methods for processing expandable styrene polymers are for example described in articles by F. Stastny which appeared in the journal "Kunststoffe," 44 (1954) 173–180 and in the journal "Der Plastverarbeiter," (1954) 260–271. They are also described in the book by H. C. v. Cube and K. E. Pohl, entitled, "Die Technologie des schäumbaren Polystyrol," Heidelberg, 1965.

It has been found that articles which have been produced by foaming the molding compositions according to this invention can be removed from the molds after relatively short minimum residence times. In particularly favorable cases the article can be taken out of the mold a few minutes after molding is over without there being any subsequent deformation of the article. It is also particularly advantageous that foam products having a very fine-celled homogeneous structure can be manufactured with the molding compositions according to this invention.

The invention is further illustrated by the following examples in which parts are by weight.

EXAMPLE 1

A mixture of 100 parts of styrene, 0.5 part of benzoyl peroxide, 7 parts of n-pentane, 200 parts of water, 0.5 part of carboxymethylcellulose and 0.1 part of sodium pyrophosphate is heated in a stirred autoclave for 20 hours at 70° C. and for 15 hours at 85° C. Spherical beads 1 to 2 mm. in diameter are formed which are separated from the aqueous phase after cooling.

The beads are pre-expanded in flowing steam to a bulk density of 20 g./l. and then stored for 24 hours at room temperature. They are subsequently loosely placed in a mold having perforated walls and measuring 100 x 100 x 30 cm. so as to fill it to the brim, and treated for 3 seconds with steam at a pressure of 1 atmosphere gauge which is introduced through the perforations, thus causing the particles to fuse together to form a solid foam block. The mold is then allowed to cool. The minimum residence time is 120 minutes; earlier removal results in post-expansion of the block.

When the amounts of 1,2,5,6-tetrabromocyclooctane indicated below are added to the mixture, foam articles which may be removed from the mold after shorter minimum residence times can be prepared.

| Amount of 1,2,5,6-tetrabromocyclooctane (parts): | Minimum residence time (minutes) |
|---|---|
| — | 120 |
| 0.001 | 100 |
| 0.1 | 40 |
| 0.3 | 10 |
| 0.6 | 5 |

EXAMPLE 2

A mixture of 90 parts of styrene, 10 parts of acrylonitrile, 6.5 parts of n-pentane, 0.5 part of hexane, 0.45 part of lauroyl peroxide, 0.32 part of tert-butyl perbenzoate, 100 parts of water, 0.1 part of sodium pyrophosphate and 0.3 part of polyvinylpyrrolidone is heated in a stirred autoclave for 10 hours at 80° C. and for 6 hours at 100° C. Spherical beads having a diameter of 0.6 to 1.5 mm. are formed which are separated from the aqueous phase after cooling.

The procedure of Example 1 is followed for molding a foam article and for calculating the minimum residence time.

The minimum residence time is 100 minutes.

When the amounts of 1,2,5,6,9,10-hexabromocyclododecane given below are added to the mixture, it is possible to prepare moldings which can be removed from the mold after shorter residence times.

| Amount of 1,2,5,6,9,10-hexabromocyclooctane (parts): | Minimum residence time (minutes) |
|---|---|
| — | 100 |
| 0.005 | 45 |
| 0.1 | 15 |
| 0.5 | 5 |

EXAMPLE 3

A mixture of a copolymer of 80 parts of styrene, 10 parts of acrylonitrile and 10 parts of methyl methacrylate (K value 60 according to Fikentscher) as well as 0.1 part of perbrominated polybutadiene having a degree of polymerization of 500 is melted in a screw extruder. 8 parts of n-pentane is added to it while in the molten state through a lateral feed pipe and the whole is homogeneously mixed. The composition is then extruded into a strand which is immediately quenched in cold water and cut into cylinders 8 mm. in length and 3 mm. in diameter. These cylinders are expandable and may be processed into solid foam articles. The minimum residence time of these compositions is 20 minutes.

EXAMPLE 4

A mixture of 100 parts of styrene, 0.4 part of benzoyl peroxide, 300 parts of water, 0.1 part of sodium pyrophosphate and 2.5 parts of pulverulent of tertiary calcium phosphate is heated in a stirred autoclave for 30 hours at 70° C. and for 10 hours at 80° C. 3 parts of pulverulent calcium carbonate (whiting) and 7.5 parts of n-pentane is added to the mixture with stirring and the whole is heated with stirring for a further 15 hours at 85° C. Expandable beads having a diameter of 0.5–2.5 mm. are formed.

The procedure of Example 1 is followed for molding a foam article and for calculating the minimum residence time.

The minimum residence time is 110 minutes.

When the type and amount of bromine compound specified below is added to the mixture by dissolving them in styrene, it is possible to manufacture from the resultant beads foam products which can be removed from the mold after shorter minimum residence times.

| Bromine compound | Amount (parts) | Minimum residence time (minutes) |
|---|---|---|
| 1-[α,β-dibromoethyl]-3,4-dibromo-cyclohexane | 0.1 | 18 |
| 1,2,5,6-tetrabromo-1,5-dimethylcyclooctane | 0.1 | 15 |
| 1,2,5,6,9,10-hexabromo-1,5,9-trimethylcyclododecane | 0.1 | 14 |

EXAMPLE 5

A mixture of 10 parts of polystyrene (K value 60) dissolved in 90 parts of styrene, 0.01 part of perbrominated poly-cis-isoprene, 0.6 part of lauroyl peroxide, 6 parts of i-pentane, 200 parts of water and 0.3 part of polyvinylpyrrolidone is heated in a stirred autoclave for 20 hours at 70° C. and for 5 hours at 90° C. Spherical beads are formed which are separated from the aqueous phase after cooling.

The minimum residence time is 12 minutes.

We claim:
1. A particulate molding composition for the production of foam articles which consists essentially of a mixture of a styrene polymer and an expanding agent, wherein the particles contain 0.005 to 0.1% by weight on the styrene polymer, in homogeneous distribution, of a brominated polymer of a 1,3-diene having a degree of polymerization of at least 2.

2. A particulate molding composition for the production of foam articles which consists essentially of a mixture of a styrene polymer and an expanding agent, wherein the particles contain 0.005 to 0.1% by weight on the styrene polymer, in homogeneous distribution, of a brominated polymer selected from the group consisting of butadiene, isoprene and chloroprene.

3. A particulate molding composition as claimed in claim 2, wherein the degree of polymerization of the brominated polymer is 2 to 2000.

4. A particulate molding composition as claimed in claim 2, wherein the degree of polymerization is 2 to 16.

References Cited

UNITED STATES PATENTS 3,093,599  6/1963  Mueller-Tamm et al.
3,361,687  2/1968  Stahnecker.

SAMUEL H. BLECH, Primary Examiner

MORTON FOELAK, Assistant Examiner

U.S. Cl. X.R.

260—17, 29.6, 880, 890